March 29, 1927.
F. G. KEYES
1,622,522
REFRIGERATION
Filed Nov. 6, 1923
5 Sheets-Sheet 1
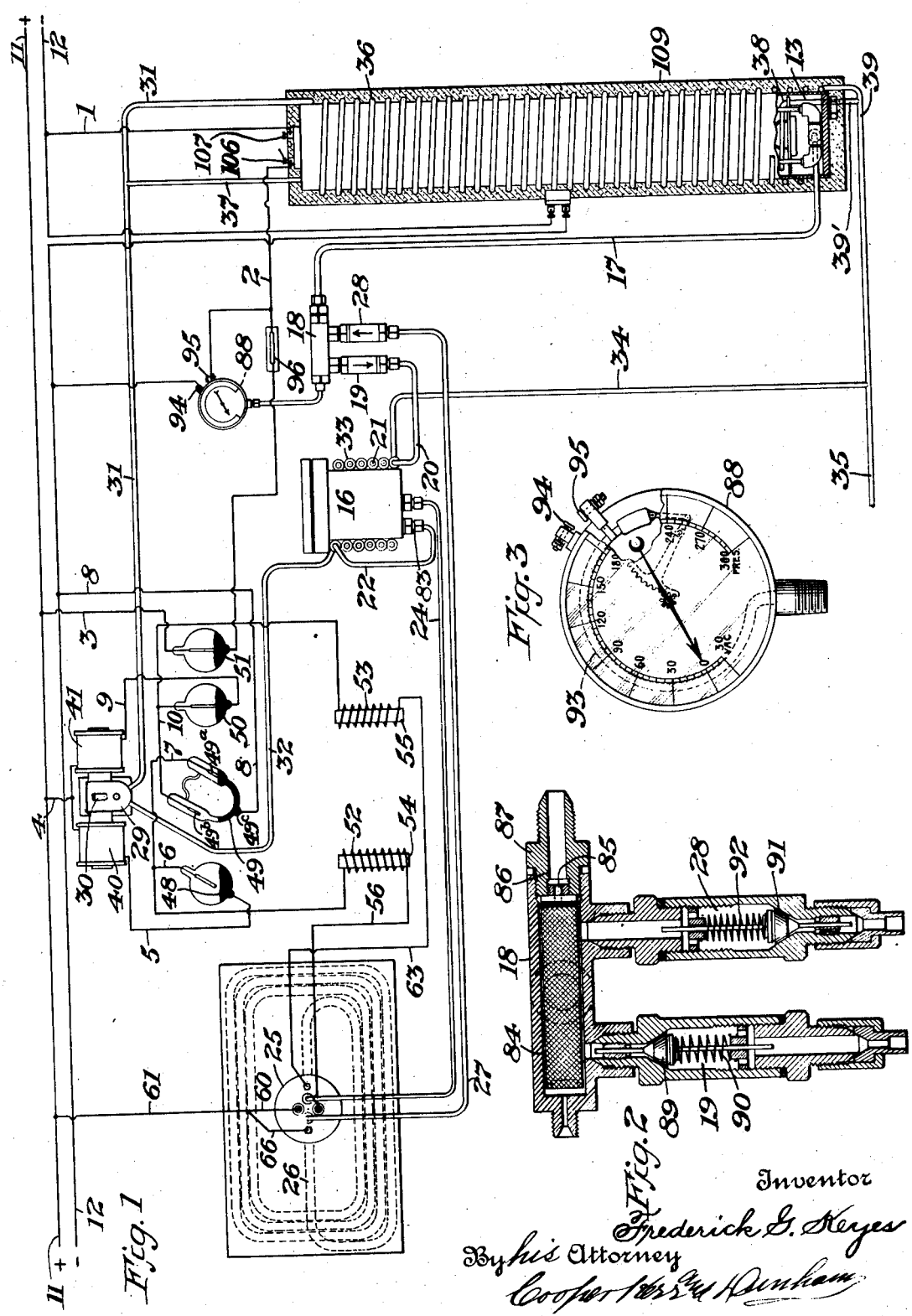

March 29, 1927.

F. G. KEYES 1,622,522

REFRIGERATION

Filed Nov. 6, 1923

Inventor
Frederick G. Keyes
By his Attorney
Cooper Kerr & Denham

March 29, 1927.　　　F. G. KEYES　　　1,622,522
REFRIGERATION
Filed Nov. 6, 1923　　　5 Sheets-Sheet 3
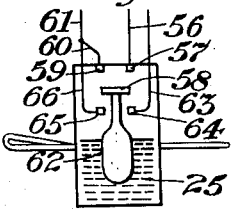
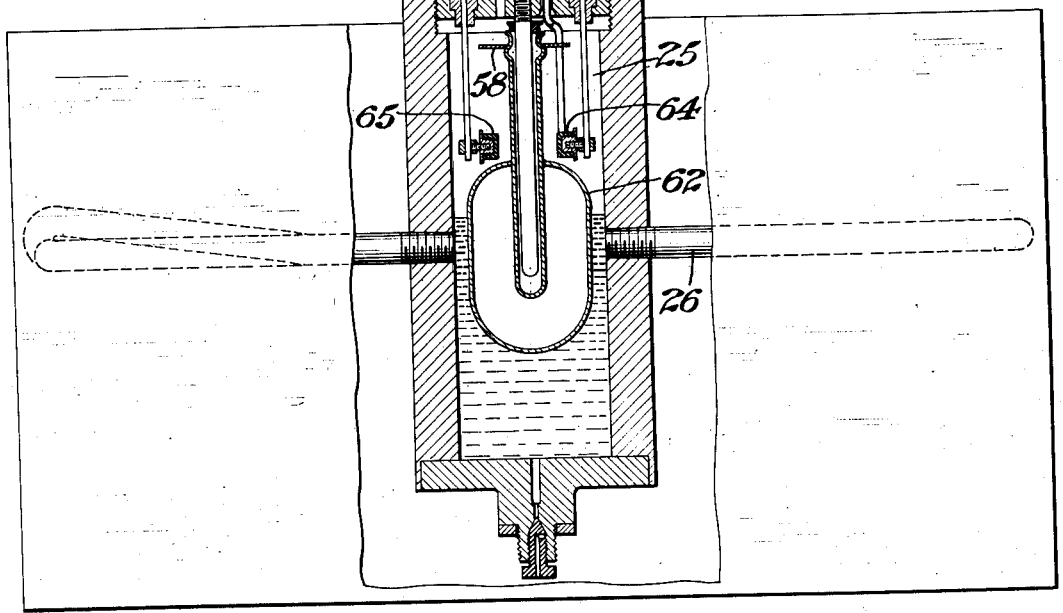
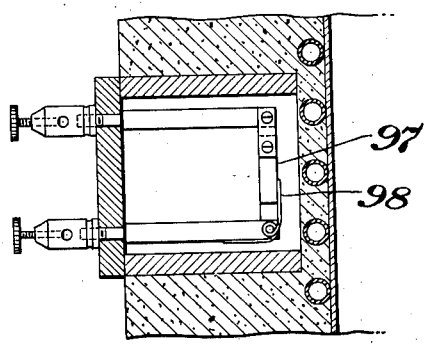
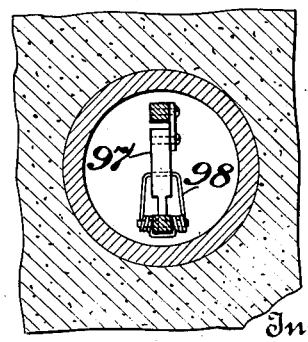
Inventor
Frederick G. Keyes
By his Attorney March 29, 1927.  F. G. KEYES  1,622,522
REFRIGERATION
Filed Nov. 6, 1923     5 Sheets-Sheet 4
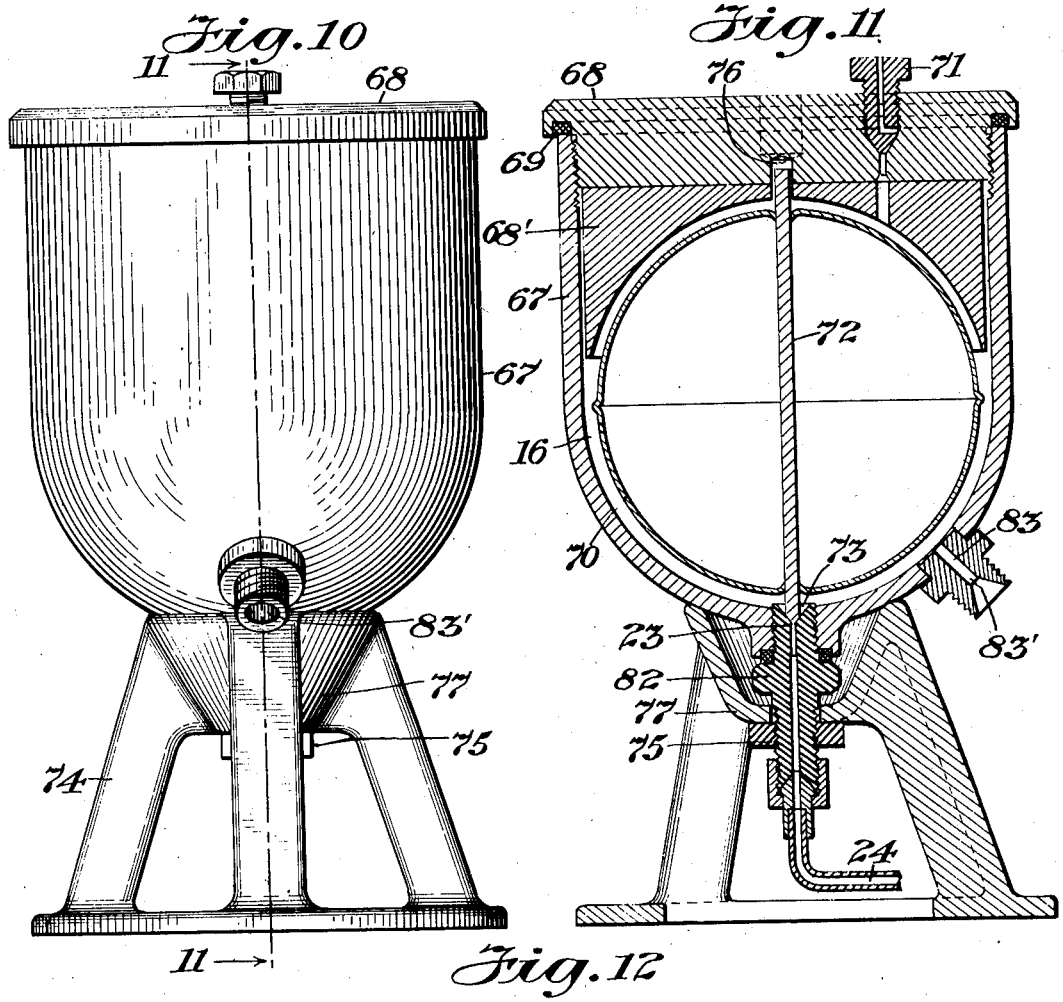
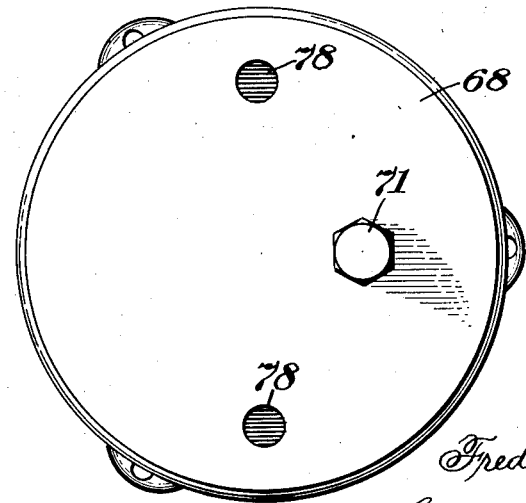
INVENTOR
Frederick G. Keyes
BY
Cooper Kerr Dunham
ATTORNEYS March 29, 1927.　　　　F. G. KEYES　　　　1,622,522
REFRIGERATION
Filed Nov. 6, 1923　　　5 Sheets-Sheet 5

Inventor:
Frederick G. Keyes
Cooper, Kerr & Dunham
His Attorneys

Patented Mar. 29, 1927.

1,622,522

UNITED STATES PATENT OFFICE.

FREDERICK G. KEYES, OF CAMBRIDGE, MASSACHUSETTS, ASSIGNOR, BY MESNE ASSIGNMENTS, TO NATIONAL REFRIGERATING COMPANY, OF BOSTON, MASSACHUSETTS, A CORPORATION OF MASSACHUSETTS.

REFRIGERATION.

Application filed November 6, 1923. Serial No. 673,105.

The present invention relates to improvements in refrigerating apparatus and more particularly of the type wherein a refrigerant, such as ammonia, for example, is cyclically distilled, evaporated and returned to and stored either mechanically or chemically in the pores or interstices of a material having an affinity for said refrigerant, and consists of a new, novel and highly efficient apparatus for practicing the described process.

I have illustrated the apparatus of my invention in the accompanying drawings, in which:

Fig. 1 is a diagrammatic representation of my apparatus.

Fig. 2 is a longitudinal sectional view through a check valve manifold of the conduit system of my apparatus.

Fig. 3 shows a Bourdon tube gauge with electrical contacts thereon for controlling an electric heating circuit at a critical pressure in the refrigerant system.

Fig. 6 is an elevation view in part section of the refrigeration chamber of my apparatus showing expansion coils and a float controlled contactor for making electrical connections through various parts of electrical control apparatus of the system in accordance with refrigerant levels in the refrigerator chamber.

Fig. 7 is a diagram of said contactor and its immediate connections.

Fig. 8 shows a thermal fuse in an electric heater circuit situated in the wall of a still which is a part of my apparatus.

Fig. 9 is an end view of said thermal fuse.

Fig. 10 is a view in elevation of a condenser chamber and liquid valve of my apparatus having a float controlled valve therein.

Fig. 11 is a vertical sectional view of Fig. 10 on line 11—11.

Fig. 12 is a plan view of the device of Fig 10.

Figure 4:
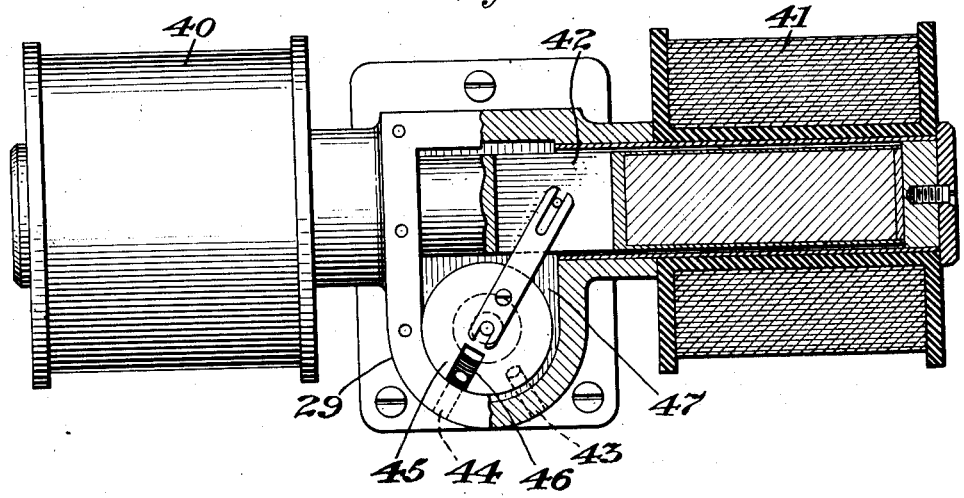
Fig. 4 is a plan view in part section of an electrically controlled two-way valve for the cooling system of my apparatus.

Referring to the drawings, a distillation chamber or still 13 containing a refrigerant has in a pocket 14 thereof an electric heating coil 15 (see Fig. 14) connected through wires 1 and 2 to the electric supply mains 11 and 12, respectively. Between lead 2 and the main 12 are connected suitable control mechanism as hereinafter fully described. A condenser comprising condensing chamber and liquid valve 16 and condensing coil 21 are connected to the still 13 by the pipe 17, the manifold 18, the check valve 19, the pipe 20, coil 21, pipe 22 to chamber 16. The check valve 19 allows the refrigerant to flow through it from the still 13 to the condensing chamber and liquid valve 16 but prevents flow through it in the opposite direction. From the condensing chamber 16 passage is provided for the refrigerant through the needle valve opening 23 (see Fig. 11), through pipe 24, to the refrigerating chamber 25 and coils 26. From the refrigerating chamber 25 connection is made through pipe 27, check valve 28, manifold 18 and pipe 17 to the interior of the still 13. The check valve 28 allows the refrigerant to flow through it from the refrigerating chamber 25 to the still 13, but prevents flow through it in the opposite direction.

Figure 5:
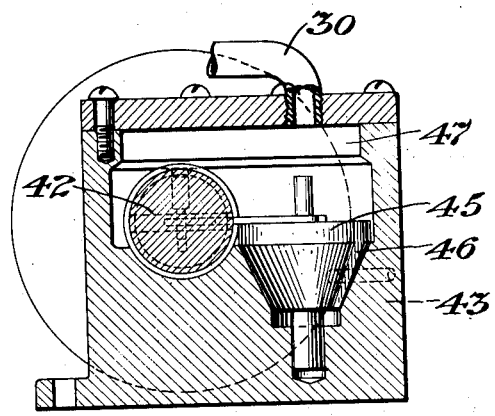
Fig. 5 is a cross sectional view of said two-way valve.
Figure 13:
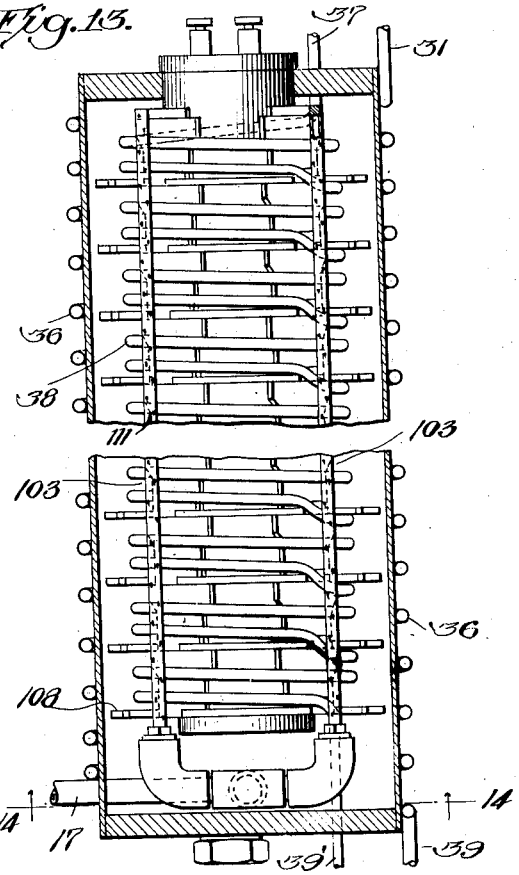
Fig. 13 is an elevation view of the interior of the still or generator of my apparatus.
Figure 15:
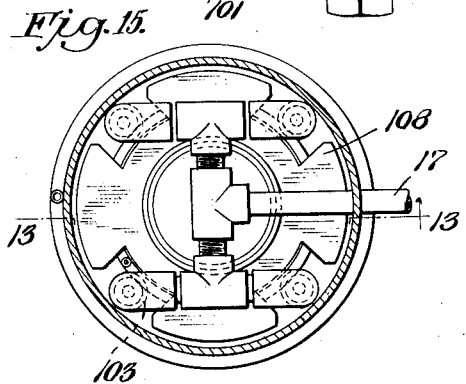
Fig. 15 is a horizontal sectional view looking in the direction of arrow 14—14 in Fig. 13.
Figure 16:
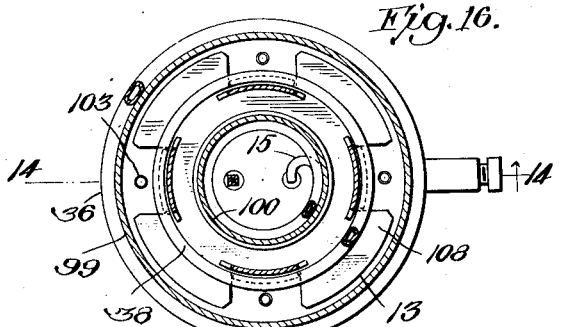
Fig. 16 is a horizontal sectional view looking in the direction of arrow 16—16 in Fig. 14.
Figure 17:
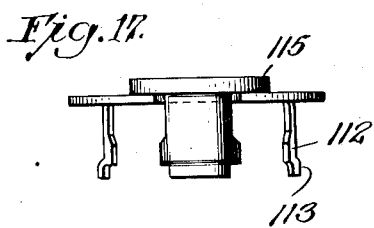
Fig. 17 shows in elevation a spacer and baffle used in the still.
Figure 18:
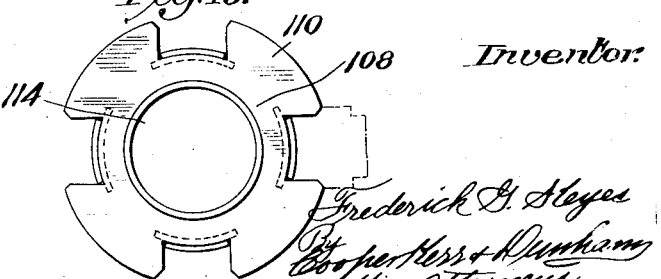
Fig. 18 is a plan view of said spacer-baffle.

In connection with the still 13 and condensing chamber 16 is a cooling system of water supply and distribution pipes, cooling coils and an electrically controlled two-way valve 29, (see Figs. 4 and 5), which latter serves to direct the flow of the water alternately through the cooling coils of said still 13 and chamber 16. The pipe 30 connects the cooling system to the water supply mains through said two-way valve 29. The pipe 31 connects the main 30 through one position of valve 29 to the coil 36 which surrounds still 13. A branch pipe 37 connects pipe 31 to an interior cooling coil 38 situated within still 13 (see also Figs. 13 and 14) and with which the refrigerating medium comes in direct contact. Coils 36 and 38 discharge through pipes 39 and 39' to the discharge pipe 35. The main 30 is connected through the valve 29 at its other position through pipe 32, cooling coil 33, pipe 34, to discharge pipe 35. Coil 33 surrounds the condensing chamber and liquid valve 16 and has coiled within it the condensing coil 21.

The valve 29 is operated to direct the water flow either through pipe 31 or pipe 32 by means of an armature 42, one end of which works in solenoid 40 and the other end in solenoid 41. By means of an automatic system of electric switches hereinafter fully described the solenoids are alternately energized to cause (see Fig. 5) the plunger 42 to rotate the cone gate 45 at certain intervals of time back and forth through the arc between the ports 43 and 44 whereby the port 46 in gate 45 alternately registers with the ports 43 and 44.

The periodic flow of current through heating coil 15 (see Fig. 14) and the flow of water through valve 29 alternately to cooling coil 33 and to cooling coils 36 and 38 are controlled by means of an electrical system including switches 48, 49, 50 and 51 and a switching arrangement in refrigerating chamber 25. The switches 48, 49, 50 and 51 are mounted on a rocking beam (not shown) which is controlled and actuated by the armatures 54 and 55 which work in solenoids 52 and 53 respectively as fully set forth in my prior application filed February 19, 1920, Serial No. 359,882. Switch 48 makes and breaks a connection in the circuit of solenoid 40, one side of which is connected through wire 5 to one side of said switch 48 and the other side through the wire 4 to the main 11. The other side of switch 48 is connected both to one side 49ª of time switch 49 and to one side of solenoid 52, the other side of said solenoid 52 being connected to the wire 56 and through it to contact 57 in said refrigerator chamber 25 (see Figs. 6 and 7). Mounted on float 62 within said chamber 25 is a contact making disc 58 which, when float 62 is at its upper limit of movement, makes contact with said contact 57 and a corresponding contact 59 which latter with wires 60 and 61 make connection with main 11. The mid-point 49ᶜ of switch 49 is connected to main 12 through wire 8. The side 49ᵇ of switch 49 is connected through wire 10 both to switch 50 and solenoid 53. The other side of switch 50 is connected through wire 9 and solenoid 41, through wire 4 to the main 11. The other side of solenoid 53 is connected through wire 63, contact 64, contacting disc 58, contact 65, wire 66, wire 61 to main 11. The switch 51 is connected on one side to main 11 and on the other to the heating coil 15 and thence to main 12.

As shown in Figs. 10, 11 and 12 the body 67 of the valve receives the vapor or liquid through the intake port 83' and discharges liquid therefrom through the opening 23 of the needle valve comprised by it and the closure 73. Intake port 83' is connected through conduit 22 and condenser coil 21 to the pipe 20 having a one-way valve from a still and discharge port 23 is connected by a pipe 24 to a refrigeration chamber 25. The float 70 is formed as a sealed hollow ball and to it is fixed the rod 72 which passes through it and the lower end of which extends below the ball and terminates in the point 73 which forms the closure for the opening 23. The upper end of the rod also extends beyond the ball and rides in the guide hole 76 which is sunk in the cap 68 of the valve. The lower part of the valve body 16 conforms in shape to that of the ball, that is, the lower part is substantially hemi-spherical. Attached to the inside of the cap 68 is the bell 68' which is concave underneath to conform in shape to the top of the ball. The inside diameters of the body 67 and of the bell 68' together with the outside diameter of the ball 70 provide for a liquid chamber 16 which is so designed as to require a minimum of liquid to operate the float thus permitting a building up of the pressure therein to force liquid through the valve. As used in connection with my refrigeration system of Fig. 1 the body thereof is surrounded with the cooling coil 33 through which passes the pipe 21 connecting refrigerant feed pipe 20 and pipe 22 which discharges into the body of the valve.

The cap 68 screws into the body 67 as shown in Figs. 10 and 11 and the bell 68' fixed to said cap is of such a diameter as to provide a close sliding fit with the inside diameter of said body. A diameter equal to the root diameter of the cap threads I find provides a good fit therefor. Between the cap 68 and the body 67 is the gasket 69 which provides for a sealing of the joint therebetween. The relief valve 71 connects with the interior 16 of the valve and serves as means for opening the interior of the valve to the air without removing the cap.

The standard 74 is affixed to the bottom of the valve body 67 by means of the nut 75 which is threaded on the nipple 82 and screwed against boss 77 at the top and center of said standard.

The discharge opening 23 of the needle valve is formed through the nipple 82, which latter is made of desired metal and with opening 23 of the desired size to meet conditions existing or desired.

As shown in Fig. 12 and in dotted line in Fig. 11, the cap 68 is provided with wrench holes 78 which facilitate the removing of the cap and the putting of it on.

In the operation of my valve liquid or vapor is admitted into the body 16 through the port 83' and upon the accumulation of a sufficient amount of liquid to lift the float 70 the needle valve 73—23 is opened and the accumulated liquid discharged therethrough and only as much as is found sufficient to lift the float. In the operation thereof in the above mentioned refrigeration system the vapor from the still of the system is condensed either in their condensing pipe 33 or in the body of the valve or partly condensed in said pipes and partly in the body of the valve. A rapid condensation of the vapor and because of the comparatively small capacity of the valve a rapid succession of discharges of liquid is fed therefrom through the discharge port 23 which in the above mentioned refrigeration system is conducted to refrigeration chamber 25. The position of the inlet port 83 near the discharge port 23 precludes any appreciable amount of vapor passing out through port 23 due to the fact that the liquid in the valve will seal port 23 against such vapor.

I have shown my valve as mounted on a standard and described its use in a refrigeration system but the valve can be mounted in various ways and it can be used in systems other than refrigeration systems and for handling liquids or vapor, or both.

In Fig. 2 is shown the details of the manifold 18 which connects the still 13 both to the condenser 16—21 and to the refrigerator 25—26. Within the manifold is a screen 84 which extends lengthwise of the manifold and is mounted to the nipple 85 which is screwed into the end of nipple 86 which in turn is screwed into the end of manifold 18. The other end of the manifold is adapted to be connected to a pressure gauge 88 as shown in Fig. 1. The valve 19 has within it a conical seat which is pressed toward the manifold by means of spring 90 and allows fluid to pass from the still 13 but prevents its flow in the opposite direction. The check valve 28 has a conical seat 91 which is pressed by spring 92 away from the manifold and allows fluid to pass to the still 13 but prevents flow in the opposite direction.

Fig. 3 shows a pressure gauge 88 for the refrigerant system. This gauge is adapted to function as a safety device which short circuits the heating coil 15 when the pressure in the system reaches a certain value. The Bourdon tube 93 carries a contact 95 and as the curvature of the tube decreases with increased pressure within the tube the contact 95 approaches and touches the stationary contact 94 through which contacts the heating coil 15 is short circuited whereby it ceases to act as a heating coil, (see Fig. 1).

As shown in Fig. 1, a fuse 96 serves to blow the circuit to the coil 15 in case the current through the mains should reach too high a value.

Another safety device is a thermal fuse 97 which is placed in one of the feed mains and positioned within the walls of the still 13 near the pipe coil 36 (see Figs. 8 and 9). This fuse is adapted to be molten should for any reason the heating coil be left on when the temperature on that account becomes excessive. The spring 98 is adapted to push the molten or softened fuse 97 to disrupt it and cause the circuit therethrough to be broken, thus causing the shutting off of the heating current through resistance coil 15.

Figure 14:
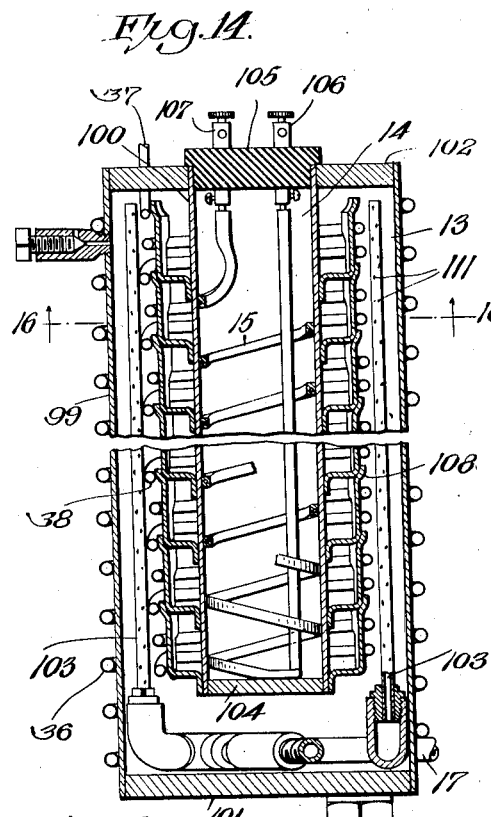
Fig. 14 is a vertical sectional view through said still.

Figs. 13 to 18 show the details of a still which I use in my refrigerating apparatus. In Fig. 14 is shown a vertical sectional view of a still having an outer wall 99, heads 101 and 102, and a re-entrant casing 100 with its head 104. The casing 100 houses the electrical heating coil 15, the terminals 106 and 107 of which are mounted on the head 105. This head 105 and the coil 15 form a unit which can be easily and quickly removed for repair or replacement, etc. The refrigerant conduit or pipe 17 passes through the wall of the outer casing 99 and divides into a plurality of perforated branches 103 (see also Figs. 13 and 15). In the interior of the still the spacing and heat conducting members 108 are mounted on the casing 100. These members serve to space the cooling coil 38 from the casing 100 and also to conduct heat from casing 100 to the absorbent material in the still or generator, as shown in Figs. 13 to 16. On the outside of casing 99 is mounted the pipe coil 36 which carries cooling fluid about the outside of the still. This coil and the still is shown in Fig. 1 as being encased in a heat insulating jacket 109.

The spacing members 108 are cup-shaped punchings having wing flanges 110 struck out and left parallel to the bottom. The cup edges 113 are upset sufficiently for one cup to nest within another for a short distance to secure rigidity when assembled on the casing 100. A rim 115 is turned up along the edge of the central opening 114 of the spacing members. This rim adds further rigidity to the spacers when assembled on the casing. The wing flanges 110 act as baffles, heat distributors and distribute to the cooling coil 38 the fluid entering from the openings 111 in pipe 103.

The operation of the refrigerating system of my invention as described above is as follows, starting with the switching apparatus in the position shown in Fig. 1, with the electric mains 11 and 12 connected to a source of current and with no refrigerant in the refrigerating chamber 25. The refrigerant will be stored in the still 13 and the heating coil 15 will be energized. When sufficient heat has been generated in the still the vaporized fluid will be forced by the resulting pressure through pipe 17 and coil 21 into the condenser chamber 16. Valve 29 being open on the condenser side, the water flowing through coil 33 will cool the fluid in coil 21 and chamber 16 causing it to condense. When a sufficient quantity of liquid has collected in chamber 16 the float 70 will be displaced and needle 73 raised thereby allowing the liquid to flow through pipe 24 into the refrigerator chamber 25, where it collects. As the level of the liquid in chamber 25 rises it carries float 62 upward and lifts contact member 58 up to contacts 57 and 59 whereby an electrical connection therebetween is established.

Current will then flow from main 11 through conductor 61, conductor 60, contact 59, contactor 58, contact 57, conductor 56, solenoid 52, conductor 7, switch 49, conductor 8 to main 12, thereby energizing the solenoid 52, the armature 54 of which being actuated will pull the switch bar (not shown) down. Switches 50 and 51 will then be open, 51 cutting off the heating current to the heating coil 15. Switch 48 will be closed and the 49ª side of time-switch 49 will remain closed for five seconds, the time required for the mercury to flow through the constriction in time-switch 49. A circuit then for five seconds will be established from main 11, wire 4, solenoid 40, wire 5, switch 48, wire 6, wire 7, the 49ª side of switch 49, terminal 49ᶜ, wire 8, to main 12, whereupon solenoid 40 will be energized and valve 29 actuated to close the port to cooling coils 33 and to open the port to pipes 31 and 37 and to cooling coils 36 and 38 (Figs. 1, 3 and 4) whereby still 13 is cooled. The current passing through solenoid 40 for five seconds insures the moving of the valve 29 to its proper position. The cooling of the still 13 results in a considerable and gradual decrease in pressure therein and withdraws vapor from the refrigerating chamber 25 through pipe 27, valve 28 and pipe 17. With the decrease in pressure there is a vaporization of the liquid in refrigerating chamber 25 and coils connected thereto attended with a consequent decrease in temperature. The vaporization and decrease in temperature in chamber 25 continue until contact is made by contactor 58 between contacts 64 and 65, switch 51 is closed and pressure raised in still 13.

As the liquid in chamber 25 vaporizes its level therein falls and with it the float 62 until the contactor 58 strikes contacts 64 and 65 whereby the circuit is closed from conductor 11, through conductors 61 and 66, contact 65, contactor 58, contact 64, conductor 63, solenoid 53, switch 49 (side 49ᵇ), conductor 8, to main 12. The solenoid 53 now being energized and solenoid 52 de-energized, switch 48 will be opened, switches 50 and 51 will be closed, and switch 49ᵇ will remain closed for a period of five seconds during which solenoid 41 will be energized for the actuation of valve 29 to close the port to pipes 31 and 37 and to cooling coils 36 and 38 and to open the port through pipe 32 to cooling coil or condenser 33 whereby liquid valve chamber 16 is cooled. Heating current now flows through heating coil 15 in still 13 and cooling water flows through pipe coils 33, the water through pipe coils 36 and 38 being turned off.

Again the vaporized refrigerant will pass from the still 13 to the condenser 21—16 where it condenses and accumulates until there is sufficient therein to displace float 70 and open valves 73, 23. The liquid again flows into the refrigerating chamber and coils connected thereto for evaporation when the contactor 58 closes the circuit through solenoid 52 and a decrease in pressure in still 13 is effected by the cooling thereof. The distillation, condensation and refrigeration cycle is thus carried on repeatedly while mains 11 and 12 are energized.

In view of the great cooling effect and small volume of space 16, the liquid is forced to condense rapidly and collect at the bottom of space 16. When sufficient liquid is accumulated to raise float and valve 73, the amount of liquid which had sufficed to raise the float is discharged through pipe 24 into chamber 25 and the float and valve 73 drop back into place. During the distillation period this accumulating and releasing operation is repeated many times in the chamber 67 until the desired level of the liquid in chamber 25 is attained, as hereinbefore set forth.

Suitable absorbent materials in the form of granules, powder, lumps, or briquettes, and so on, are distributed on the horizontal surfaces of fins 108 of baffle plates 110 of still 13, and materials, among others, which I contemplate using herein for this purpose are ammoniated chemical compounds such as described in my applications Ser. Nos. 475,855, filed June 8, 1921; 586,550, filed September 6, 1922; and 590,668, filed September 26, 1922, of which this application is a continuation in part. A particular chemical compound material is the calcium chloride, magnesium oxychloride material of my application Ser. No. 590,668, to which has been added in the preparation of said material as described in said application a quantity up to 10% of commercial alundum cement.

I claim:

1. In refrigerating apparatus, in combination, a refrigerator chamber, a condenser, a still, pipe connection from said still to said condenser with a check valve therein permitting flow from said still to said condenser, pipe connection from said condenser to said refrigeration chamber, pipe connection from said refrigeration chamber to said still with a check valve therein permitting flow from said refrigeration chamber to said still, a refrigerant therein, heating means for said still, cooling means for said still, cooling means for said condenser, means for controlling said beforementioned means for causing the still heating means and condenser cooling means to operate and to cause said still cooling means to be inoperative and vice versa, means controlled by the liquid level in said refrigerating chamber for controlling said first mentioned controlling means, and means in said condenser for repeatedly passing liquid to the refrigerating chamber during the distilling period.

2. In refrigerator apparatus, in combination, a still, a condenser, a refrigerator chamber, a one-way pipe connection from the still to the condenser, a pipe connection from the condenser to the refrigerator chamber, a one-way pipe connection from the refrigerator chamber to the still, a liquid level controlled valve in said condenser for repeatedly passing liquid to the refrigerating chamber during the distilling period, cooling means for said still, heating means for said still, cooling means for said condenser, and means controlled by the liquid level in said refrigerator chamber for causing the still heating means and condenser cooling means to operate and the still cooling means to be inoperative simultaneously and for causing the still cooling means to operate and the still heating means and the condenser cooling means to be inoperative simultaneously.

3. In a refrigerating apparatus, in combination, a still, a condenser, a refrigerator, one-way pipe connection from said still to said condenser, pipe connection between said condenser and said refrigerator, one-way pipe connection from said refrigerator to said still, a liquid level operated valve in said condenser opening into said refrigerator connecting pipe for repeatedly passing liquid to the refrigerating chamber during the distilling period, a source of water supply, water pipe coils about said condenser, water pipe coils in and about said still, a two-way valve connected to said water supply and to said pipe coils, electric supply mains connected to a heating coil in said still, a switch in said electrical connection, electric means for controlling said valve whereby water can be sent through said condenser cooling coils or through said still cooling coils alternately, connections between said electric supply mains and said valve controlling means and switches in said connections, and means controlled by the liquid level in said refrigerator chamber for controlling said heating coil switch and said valve controlling means.

4. In refrigerating apparatus, in combination, a refrigerator chamber, a condenser, a still, pipe connection from said still to said condenser with a check valve therein permitting flow from said still to said condenser, pipe connection from said condenser to said refrigerator chamber, pipe connection from said refrigeration chamber to said still with a check valve therein permitting flow from said refrigeration chamber to said still, a refrigerant therein, heating means for said still, cooling means for said still, cooling means for said condenser, means for controlling said beforementioned means for causing the still heating means and condenser cooling means to operate and to cause said still cooling means to be inoperative and vice versa, means controlled by the liquid level in said refrigerating chamber for controlling said first mentioned controlling means, and means for retaining the vapor at the condenser until sufficient pressure is developed at that point to cause it to condense and to force accumulated liquid in the desired direction.

In testimony whereof I hereto affix my signature.

FREDERICK G. KEYES.